(12) United States Patent
Zhang et al.

(10) Patent No.: US 9,257,067 B2
(45) Date of Patent: Feb. 9, 2016

(54) LIGHT SOURCE DRIVING CIRCUIT OF LIGHT EMITTING SEMICONDUCTOR AND BACKLIGHT MODULE

(71) Applicant: Shenzhen China Star Optoelectronics Technology Co., Ltd., Shenzhen, Guangdong (CN)

(72) Inventors: Hua Zhang, Shenzhen (CN); Xianming Zhang, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 308 days.

(21) Appl. No.: 13/985,642

(22) PCT Filed: Jun. 25, 2013

(86) PCT No.: PCT/CN2013/077850
§ 371 (c)(1),
(2) Date: Aug. 15, 2013

(87) PCT Pub. No.: WO2014/183321
PCT Pub. Date: Nov. 20, 2014

(65) Prior Publication Data
US 2015/0294615 A1  Oct. 15, 2015

(30) Foreign Application Priority Data

May 13, 2013  (CN) .......................... 2013 1 0175053

(51) Int. Cl.
G09G 3/36 (2006.01)
G09G 3/32 (2006.01)
G09G 3/34 (2006.01)
H05B 33/08 (2006.01)
H04N 13/04 (2006.01)

(52) U.S. Cl.
CPC ................ *G09G 3/32* (2013.01); *G09G 3/3406* (2013.01); *H04N 13/0454* (2013.01); *H05B 33/0818* (2013.01); *H05B 33/0845* (2013.01); *G09G 2310/08* (2013.01); *G09G 2320/0233* (2013.01); *G09G 2320/0252* (2013.01); *G09G 2320/0626* (2013.01); *G09G 2330/02* (2013.01); *G09G 2330/028* (2013.01)

(58) Field of Classification Search
CPC ............................. H04N 13/0454; G09G 3/32
See application file for complete search history.

(56) References Cited

U.S. PATENT DOCUMENTS

| 2007/0080905 | A1* | 4/2007 | Takahara | ............. G09G 3/3233 345/76 |
| 2012/0320023 | A1* | 12/2012 | Tsai et al. | ...................... 345/212 |
| 2013/0021326 | A1* | 1/2013 | Tsai et al. | ...................... 345/419 |
| 2013/0050280 | A1* | 2/2013 | Huang | ........................... 345/690 |
| 2013/0257827 | A1* | 10/2013 | Hsieh et al. | ................... 345/204 |

* cited by examiner

*Primary Examiner* — Dennis Joseph
(74) *Attorney, Agent, or Firm* — Andrew C. Cheng

(57) ABSTRACT

A light source driving circuit of light emitting semiconductor and a backlight module are provided. The light source driving circuit of light emitting semiconductor includes a driving control circuit and a constant current driving circuit coupled to the driving control circuit for controlling a current flowing through the light emitting semiconductor. When the driving control circuit receives a display-mode-switch signal which has an indication for switching from a present display mode to a new display mode, the driving control circuit controls the constant current driving circuit such that in the process of switching from the present display mode to the new display mode, the current flowing through the light emitting semiconductor changes gradually.

12 Claims, 3 Drawing Sheets

LIGHT SOURCE DRIVING CIRCUIT OF LIGHT EMITTING SEMICONDUCTOR AND BACKLIGHT MODULE

BACKGROUND OF THE INVENTION

1. Field of the Invention

The present invention relates to a display, and more particularly to a light source driving circuit of light emitting semiconductor and a backlight module.

2. Description of Related Art

LCD display panel cannot generate light itself, it requires utilize the backlight method to project the light to the display panel and makes the display panel produce a brightness, and the brightness should distribute evenly to the display screen to obtain a good picture. Currently, the backlight source of the LCD display panel is mainly divided into two kinds of LED and CCFL. Comparing to the CCFL backlight, the LED backlight source has low power consumption, long life, thin, and good optical properties. Therefore, utilizing white LED as the backlight source of the LCD display is becoming the direction of development of LCD TV.

As shown in FIG. 1, in the LED backlight driving circuit, a current amplitude of the LED is decided by a reference voltage Va required by the constant current driver IC and the current limiting resistor R0, i.e., 1=Va/R0. The reference voltage Va is provided by an external circuit to the constant current driver IC. The current flowing through the LED determines the emitting brightness of the LED. However, the brightness of the LED backlight required in the 2D display mode and the 3D display mode is not the same. Thus, under the current limiting resistor R0 is determined, the reference voltage Va required at the 2D display mode and the 3D display mode is not the same.

In the 2D display mode, The MOS tube Q12 is turned off, and MOS tube Q11 is turned on. At this time, resistors R11, R12 and R13 are in working condition. The R12 and R13 are in parallel and divide a voltage so that the voltage value Va is relatively small. In the 3D display mode, the MOS tube Q12 is turned on, and the MOS tube Q11 is turned off. At this time, only the resistors R11 and R12 are in working condition, so that the Va voltage value is relatively larger than the Va voltage value in the 2D display mode. In addition, a PWM dimming signal is for changing and adjusting the duty ratio of the LED current such that the current flowing through the LED becomes smaller in the average value in order to achieve the effect of reducing the backlight brightness.

The manner described above can achieve that obtaining different Va voltage values in the different display modes and the PWM dimming signal, and obtaining the LED brightness in the corresponding display mode. However, when switching between the 2D display mode and the 3D display mode, the switching speed is very fast. When switching the LED brightness in the 2D display mode to the 3D display mode, or switching, the LED brightness in the 3D display mode to the 2D display mode, the current flowing through LED change suddenly such that the brightness of the LED backlight will change suddenly, which could easily lead to a strong visual impact to the viewer, and reducing the viewing experience.

SUMMARY OF THE INVENTION

The main object of the present invention is to provide a light source driving circuit of light emitting semiconductor and a backlight module. They can make the brightness of the light emitting semiconductor in different display modes change gradually when the switching display modes to avoid the brightness of the light emitting semiconductor changing suddenly.

The technical, problem solved by the present invention is to provide a light source driving circuit of light emitting semiconductor comprising: a driving control circuit having a first input terminal, a second input terminal, a first output terminal, and a second output terminal, wherein the first input terminal is for inputting a display-mode-switch signal, and the second input terminal is for inputting a dimming signal; and a constant current driving circuit coupled to the driving control circuit for controlling a current flowing through the light emitting semiconductor and having a third input terminal and a fourth input; wherein, the first output terminal of the driving control circuit connects to the third input terminal of the constant current driving circuit, for inputting a reference voltage to the constant current driving circuit; the second output terminal of the driving control circuit connects to the fourth input terminal of the constant current driving circuit, for inputting the dimming signal which has passed through the driving control circuit to the constant current driving circuit; when the driving control circuit receives the display-mode-switch signal which has an indication for switching from a present display mode to a new display mode, the driving control circuit controls the reference voltage and/or the dimming signal to control the constant current driving circuit such that in the process of switching from the present display mode to the new display mode, the current flowing through the light emitting semiconductor changes gradually and linearly, wherein the light emitting semiconductor is an LED.

Wherein, when the driving control circuit receives the display-mode-switch signal which has the indication for s\ itching from the present display mode to the new display mode, the driving control circuit controls the reference voltage outputted at the first output terminal to change gradually from a present voltage to a new voltage required at the new display mode, and controls a duty ratio of the dimming signal outputted at the second output terminal to change gradually from a present duty ratio to a new duty ratio at the new display mode, and further controls the constant current driving circuit such that the constant current driving circuit controls the current flowing through the light emitting semiconductor change gradually from a present current to a current corresponding to the new display mode.

Wherein, when the present display mode is a 2D display mode and the new display mode is a 3D display mode, and the driving control circuit receives a display-mode-switch signal which has an indication for switching from the 2D display mode to the 3D display mode, the driving control circuit controls the reference voltage outputted at the first output terminal to increase gradually to a voltage required in the 3D display mode, and the driving control circuit controls a duty ratio of the dimming signal outputted at the second output terminal and corresponding to the 2D display mode to gradually increase to a predetermined duty ratio corresponding to the 3D display mode; and when the present display mode is a 3D display mode and the new display mode is a 2D display mode, and the driving control circuit receives a display-mode-switch signal which has an indication for switching from the 3D display mode to the 2D display mode, the driving control circuit controls the reference voltage outputted at the first output terminal to decrease gradually to a voltage required in the 2D display mode, and the driving control circuit controls a duty ratio of the dimming signal outputted at the second output terminal and corresponding to the 3D display mode to gradually decrease to a duty ratio corresponding to the 2D display mode.

Wherein, when the driving control circuit receives the display-mode-switch signal which, has the indication for switching from the present display mode to the new display mode, the driving control circuit controls the reference voltage outputted at the first output terminal to change from a present voltage to a new voltage required by the new display mode, and controls the duty ratio of the dimming signal outputted at the second output terminal to change gradually from a present duty ratio to a new duty ratio required in the new display mode, and further controls the constant current driving circuit such that the constant current driving circuit controls the current flowing through the light emitting semiconductor change gradually from a present current to a current corresponding to the new display mode.

Wherein, when the driving control circuit receives the display-mode-switch signal which has the indication for switching from the present display mode to the new display mode, the driving control circuit controls the reference voltage outputted at the first output terminal to change gradually from a present voltage to a new voltage required by the new display mode, and controls the duty ratio of the dimming signal outputted at the second output terminal to change from a present duty ratio to a new duty ratio required in the new display mode, and further controls the constant current driving circuit such that the constant current driving circuit controls the current flowing through the light emitting semiconductor change gradually from a present current to a current corresponding to the new display mode.

Wherein, further comprising an RC filtering having: a first resistor connected in series between the first output terminal of the driving control circuit and the first input terminal of the constant current diving circuit; and a first capacitor having two ends, wherein one end connects to the first input terminal of the constant current driving circuit and the other end connects to a ground.

In order to solve the above-mentioned technical problem, another technical solution provided by the present invention is a light source driving circuit, of light emitting semiconductor comprising: a driving control circuit; and a constant current driving circuit coupled to the driving control circuit for controlling a current flowing through the light emitting semiconductor; wherein, when the driving control circuit receives a display-mode-switch signal which has an indication for switching from a present display mode to a new display mode, the driving control circuit controls the constant current driving circuit such that in the process of switching from the present display mode to the new display mode, the current flowing through the light emitting semiconductor changes gradually.

Wherein, the driving control circuit having a first input terminal, a second input terminal, a first output terminal, and a second output terminal, wherein the first input terminal is for inputting the display-mode-switch signal, and the second input terminal is for inputting a dimming signal; the constant current driving circuit having a third input terminal and a fourth input; wherein, the first output terminal of the driving control circuit connects to the third input terminal of the constant current driving circuit, for inputting a reference voltage to the constant current driving circuit; the second output terminal of the driving control circuit connects to the fourth input terminal of the constant current driving circuit, for inputting the dimming signal which has passed through the driving control circuit to the constant current driving circuit; the driving control circuit controls the reference voltage and/or the dimming signal to control the constant current driving circuit.

Wherein, when the driving control circuit receives the display-mode-switch signal which, has the indication for switching from the present display mode to the new display mode, the driving control circuit controls the reference voltage outputted at the first output terminal to change gradually from a present voltage to a new voltage required at the new display mode, and controls a duty ratio of the dimming signal outputted at the second output terminal to change gradually from a present duty ratio to a new duty ratio at the new display mode, and further controls the constant current driving circuit such that the constant current driving circuit controls the current flowing through the light emitting semiconductor change gradually from a present current to a current corresponding to the new display mode.

Wherein, when the present display mode is a 2D display mode and the new display mode is a 3D display mode, and the driving control circuit receives a display-mode-switch signal which has an indication for switching from the 2D display mode to the 3D display mode, the driving control circuit controls the reference voltage outputted at the first output terminal to increase gradually to a voltage required in the 3D display mode, and the driving control circuit controls a duty ratio of the dimming signal outputted at the second output terminal and corresponding to the 2D display mode to gradually increase to a predetermined duty ratio corresponding to the 3D display mode; and when the present display mode is a 3D display mode and the new display mode is a 2D display mode, and the driving control circuit receives a display-mode-switch signal which has an indication for switching from the 3D display mode to the 2D display mode, the driving control circuit controls the reference voltage outputted at the first output terminal to decrease gradually to a voltage required in the 2D display mode, and the driving control circuit controls a duty ratio of the dimming signal outputted at the second output terminal and corresponding to the 3D display mode to gradually decrease to a duty ratio corresponding to the 2D display mode.

Wherein, when the driving control circuit receives the display-mode-switch signal which has the indication for switching from the present display mode to the new display mode, the driving control circuit controls the reference voltage outputted at the first output terminal to change from a present voltage to a new voltage required by the new display mode, and controls the duty ratio of the dimming signal outputted at the second output terminal to change gradually from a present duty ratio to a new duty ratio required in the new display mode, and further controls the constant current driving circuit such that the constant current driving circuit controls the current flowing through the light emitting semiconductor change gradually from a present current to a current corresponding to the new display mode.

Wherein, when the driving control circuit receives the display-mode-switch signal which has the indication for switching from the present display mode to the new display mode, the driving control circuit controls the reference voltage outputted at the first output terminal to change gradually from a present voltage to a new voltage required by the new display mode, and controls the duty ratio of the dimming signal outputted at the second output terminal to change from a present duty ratio to a new duty ratio required in the new display mode, and further controls the constant current driving circuit such that the constant current driving circuit controls the current flowing through the light emitting semiconductor change gradually from a present current to a current corresponding to the new display mode.

Wherein, further comprising an RC filtering having: a first resistor connected in series between the first output terminal of the driving control circuit and the first input terminal of the constant current driving circuit; and a first capacitor having two ends, wherein one end connects to the first input terminal of the constant current driving circuit and the other end connects to a ground.

Wherein, when the driving control circuit receives the display-mode-switch signal which has the indication for switching from the present display mode to the new display mode, the driving control circuit controls the constant current driving circuit such that in the process of switching from the present display mode to the new display mode, the current flowing through the light emitting semiconductor changes gradually and linearly.

Wherein, the light emitting semiconductor is an LED.

In order to solve the above-mentioned technical problem, another technical solution provided by the present invention is a backlight module comprising a light source driving circuit of light emitting semiconductor, and the light source driving circuit of light emitting semiconductor comprises: a driving control circuit; and a constant current driving circuit coupled to the driving control circuit for controlling a current flowing through the light emitting semiconductor; wherein, when the driving control circuit receives a display-mode-switch signal which has an indication for switching from a present display mode to a new display mode, the driving control circuit controls the constant current driving circuit such that in the process of switching from the present display mode to the new display mode, the current flowing through the light emitting semiconductor changes gradually.

Wherein, the driving control circuit having a first input terminal, a second input terminal, a first output terminal, and a second output terminal, wherein the first input terminal is for inputting the display-mode-switch signal, and the second input terminal is for inputting a dimming signal; the constant current driving circuit having a third input terminal and a fourth input; wherein, the first output terminal of the driving control circuit connects to the third input term al of the constant current driving circuit, for inputting a reference voltage to the constant current driving circuit; the second output terminal of the driving control circuit connects to the fourth input terminal of the constant current driving circuit, for inputting the dimming signal which has passed through the driving control circuit to the constant current driving circuit; the driving control circuit controls the reference voltage and/or the dimming signal to control the constant current driving circuit.

Wherein, when the driving control circuit receives the display-mode-switch signal which has the indication for switching, from the present display mode to the new display mode, the driving control circuit controls the reference voltage outputted at the first output terminal to change gradually from a present voltage to a new voltage required at the new display mode, and controls a duty ratio of the dimming signal outputted at the second output terminal to change gradually from a present duty ratio to a new duty ratio at the new display mode, and further controls the constant current driving circuit such that the constant current driving circuit controls the current flowing through the light emitting semiconductor change gradually from a present current to a current corresponding to the new display mode.

Wherein, when the present display mode is a 2D display mode and the new display mode is a 3D display mode, and the driving control circuit receives a display-mode-switch signal which has an indication for switching from the 2D display mode to the 3D display mode, the driving control circuit controls the reference voltage outputted at the first output terminal to increase gradually to a voltage required in the 3D display mode, and the driving control circuit controls a duty ratio of the dimming signal outputted at the second output terminal and corresponding to the 2D display mode to gradually increase to a predetermined duty ratio corresponding to the 3D display mode; and when the present display mode is a 3D display mode and the new display mode is a 2D display mode, and the driving control circuit receives a display-mode-switch signal which has an indication for switching from the 3D display mode to the 2D display mode, the driving control circuit controls the reference voltage outputted at the first output terminal to decrease gradually to a voltage required in the 2D display mode, and the driving control circuit controls a duty ratio of the dimming signal outputted at the second output terminal and corresponding to the 3D display mode to gradually decrease to a duty ratio corresponding to the 2D display mode.

Wherein, when the driving control circuit receives the display-mode-switch signal which has the indication for switching from the present display mode to the new display mode, the driving control circuit controls the reference voltage outputted at the first output terminal to change from a present voltage to a new voltage required by the new display mode, and controls the duty ratio of the dimming signal outputted at the second output terminal to change gradually from a present duty ratio to a new duty ratio required in the new display mode, and further controls the constant current driving circuit such that the constant current driving circuit controls the current flowing through the light emitting semiconductor change gradually from a present current to a current corresponding to the new display mode.

The beneficial effects of the present invention are: comparing to the prior art, in a light source driving circuit of light emitting semiconductor, the light source driving circuit of light emitting semiconductor includes a driving control circuit and a constant current driving circuit coupled to the driving control circuit for controlling a current flowing through the light emitting semiconductor. When the driving control circuit receives a display-mode-switch signal which has an indication for switching from a present display mode to a new display mode, the driving control circuit controls the constant current driving circuit such that in the process of switching from the present display mode to the new display mode, the current flowing through the light emitting semiconductor changes gradually. Since a brightness of a light emitting semiconductor is determined by a current flowing through it, in the process of switching from the present display mode to the new display mode, the current flowing through the light emitting semiconductors changes gradually so that the brightness of the light emitting semiconductors change gradually. Thereby, it effectively avoids a sudden brightness change of the display panel in the switching of different display modes, which reduces the discomfort of human eye.

DETAILED DESCRIPTION OF THE PREFERRED EMBODIMENT

The following content combines with the drawings and the embodiment for describing the present invention in detail.

Figure 1:
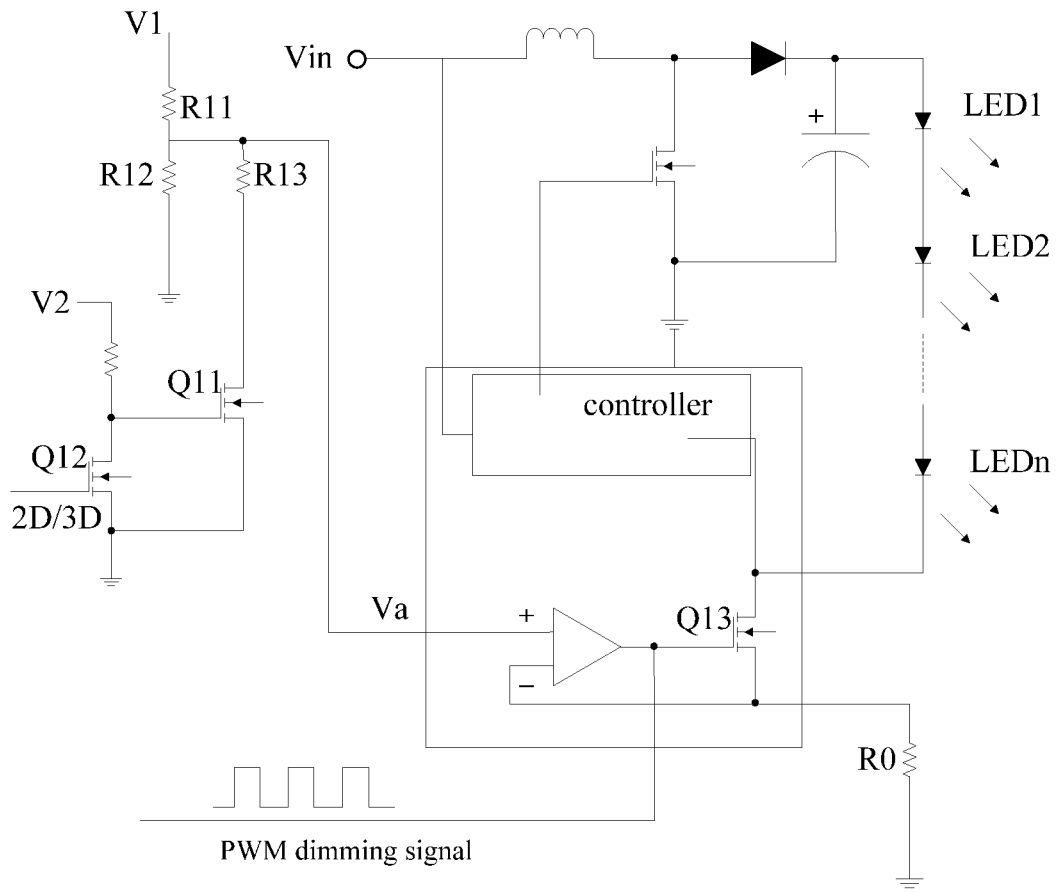
FIG. 1 is a schematic drawing of an LED backlight driving, circuit according to the prior art.
Figure 2:
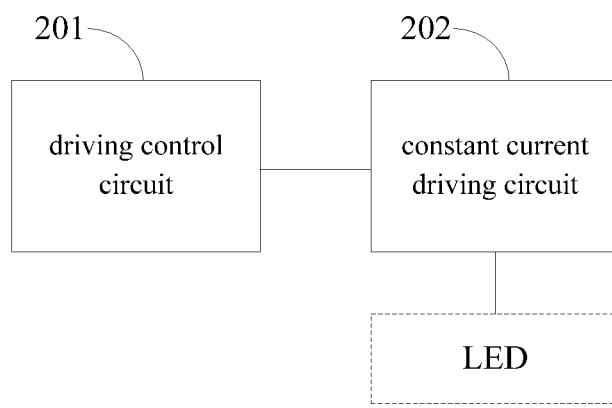
FIG. 2 is a schematic drawing, of light source driving circuit of light emitting semiconductor according to one embodiment of the present invention.

With reference to FIG. 2, it is a schematic drawing of light source driving circuit of light emitting semiconductor according to one embodiment of the present invention. The light source driving circuit of light emitting semiconductor includes a driving control circuit 201 and a constant current driving circuit 202.

Wherein, the constant current driving circuit 202 is for controlling the current lowing through the light emitting semiconductors. The driving control circuit 201 couples to the constant current driving circuit 202. In one embodiment of the present invention, when display modes of the display panel change, for example, from a 2D display mode to a 3D display mode or from a 3D display mode to a 2D display mode, and when the driving control circuit 201 receives a display-mode-switch signal which has an indication for switch from a present display mode to a new display mode, the driving control circuit 201 controls the constant current driving circuit 202 such that the current lowing through the light emitting semiconductors changes gradually from the present display mode to the new display mode.

A brightness of a light emitting semiconductor is determined by a current flowing through it. In the process of switching from the present display mode to the new display mode, the current flowing through the light emitting semiconductors changes gradually so that the brightness of the light, emitting semiconductors change gradually. Thereby, it effectively avoids a sudden brightness change of the display panel from one display mode to another display mode, which reduces the discomfort of human eye.

The following combines a specific circuit structure of the present invention for describing the light source driving circuit of light, emitting semiconductor in detail.

Figure 3:
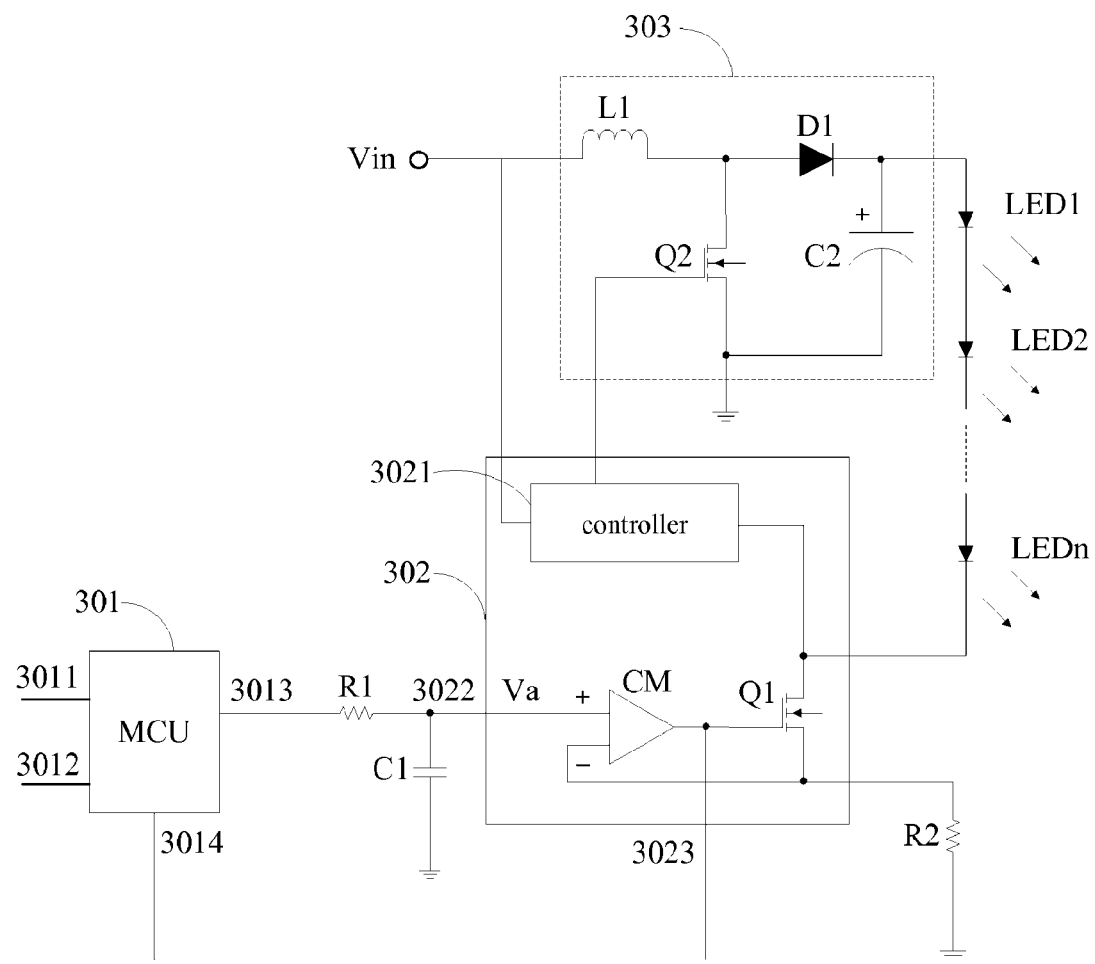
FIG. 3 is a specific drawing of light source driving circuit of light emitting semiconductor according to one embodiment of the present invention.

With references to FIG. 3, it is a specific drawing of a light source driving circuit of light emitting semiconductor according to one embodiment of the present invention. In the present embodiment, it utilizes LED as an example for the light emitting semiconductor, the driving circuit of light emitting semiconductor is an LED backlight driving circuit for driving the LED as a backlight source of the display panel.

The LED backlight driving circuit is a series-type backlight driving circuit, that is, the LED backlight driving circuit is for driving a plurality of LEDs in series. The driving control circuit of the present embodiment is a Micro-Controller Unit (MCU) 301. The constant current driving circuit is an LED constant current driver chip 302. The MCU 301 includes a first input terminal 3011, a second input terminal 3012, a first output terminal 3013, and a second output terminal 3014.

The LED constant current driver chip 302 includes a third input terminal 3022 and a fourth input 3023. The LED constant current driver chip 302 includes a controller 3021, a comparator CM and a first switch Q1. The LED backlight driving circuit further includes a voltage conversion circuit. 303, a current limiting resistor R2, a first resistor R1, and an RC filtering circuit composed of a first resistor and a first capacitor C1. The voltage conversion circuit 303 is a boost circuit for converting an external power source Vin to a voltage required for driving the LED string (LED1, LED2, . . . , LEDn). The voltage conversion circuit 303 includes an inductor L1, a second switch Q2, a rectifier diode D1 and a discharge capacitor C2.

Wherein, the first input terminal 3011 of the MCU is for inputting a display-mode-switch signal, and the second input terminal 3012 is for inputting a dimming signal, the first output terminal 3013 connects to the third terminal 3022 of the constant current LED driver chip 302 through the first resistor R1 for outputting the reference voltage Va. The second output 3014 of the MCU connects to the fourth input terminal 3023 of the LED constant current driver chip 302 for providing the dimming signal which has passed through the MCU to the LED constant current driver chip 302. The MCU controls the LED constant current driver chip 302 through outputting the reference voltage Va and the dimming signal to the LED constant current driver chip 302 so as to control the current flowing through the LED string.

In this embodiment, before filtering by the RC filtering circuit, the output voltage signal of the first output terminal 3013 of the MCU is a rectangular-wave signal. After filtering, the rectangular-wave signal becomes a DC voltage and inputs to the comparator CM of the LED constant current driver chip 302. The DC voltage is the reference voltage Va required for the LED constant current driver chip 302. One end of the inductor L1 connects to an output terminal of the external power source Vin, and the other end of the inductor L1 connects to an anode of the rectifying diode D1. A cathode of the rectifying diode D1 connects to an anode of the LED string for outputting the driving voltage to the LED string.

A control terminal of the second switch Q2 connects to the output terminal of the controller 3021. An input terminal of the second switch Q2 connects to an anode of the rectifier diode D1, and an output terminal of the second switch Q2 connects to a ground. One end of the discharge capacitor C2 connects to the anode of the LED string, and the other end of discharge capacitor C2 connects to the ground.

A power supply terminal of the controller 3021 connects the external power source Vin to receive power from the external power source Vin. An input terminal of the controller 3021 connects the cathode of the LED string. The positive input terminal of the comparator CM functions as the third input terminal 3022 of the LED constant current driver chip 302 and connects to the first resistor R1 so as to connect to the first output terminal 3013 of the MCU through the first resistor R1. The negative input terminal of the comparator CM connects to an output terminal of the first switch Q1 and simultaneously to the current limiting resistor R2. The output terminal of the comparator CM connects to a control terminal of the first switch Q1. The control terminal of the first switch Q1 function as the fourth input terminal 3023 of the LED constant current driver 302 and connects to the second output terminal 3014 of the MCU, an input terminal of the first switch Q1 connects to the cathode of the LED string.

Wherein the first switch Q1 and the second switch Q2 are all thin film transistors (TFTs). The control terminals of the switches correspond to gates of the TFTs. The input terminals of the switches correspond to sources of the TFTs. The output terminals of the switches correspond to drains of the TFTs. In another embodiment, the first switch Q1 and the second switch Q2 may also be Darlington transistors or other three-terminal control circuits.

When driving the LED string to operate, the external power source Vin provides an output voltage, and the controller 3021 outputs the control signal to the second switch Q2 to turn on the second switch Q2. At this time, the inductor L1 converts electrical energy to magnetic energy and stores it. The driving voltage of the LED string is provided by the discharge capacitor C2. Subsequently, the controller 3021 outputs the control signal to the second switch Q2 to turn off it. The inductor L1 converts the stored magnetic energy to electrical energy, and providing the driving voltage of the LED string and charging the discharge capacitor C2 at the same time. The driving voltage of the LED string is a superposition of the external power source Vin and the electrical energy converted through the boost inductor L1. Therefore, the voltage conversion circuit 303 achieves the voltage conversion and provides the driving voltage required for the LED string.

The LED constant current drive chip 302 controls the current flowing through the LED string in order to achieve the brightness adjustment of the LED backlight. Specifically, the current flowing through the LED string is controlled by the reference voltage Va and the dimming signal. A current flowing through the LED string is a ratio of the reference voltage Va to the at limit resistor R2. When the resistance of the current limit resistor R2 is constant, changing the reference voltage Va can change the current flowing through the LED string in order to change the brightness of the LED backlight.

In the present embodiment, the dimming signal is a PWM dimming signal, which is for controlling on and off of the first switch Q1. Furthermore, when the PWM dimming signal is high, the first switch Q1 is turned on, and LED string is emitting light. The reference voltage Va can adjust the current; the PWM dimming signal is low, the first switch Q1 is turned off, and the reference voltage Va cannot adjust the current. There is no current flowing through LED string, and the LED string is not emitting light. By the function of the PWM dimming signal, it can adjust the duty ratio of the current flowing through the LED string such that the average current of the LED string is decreased to reduce the brightness of the LED backlight.

For example, assuming that the driving voltage of the LED string is 10V, duty ratio of the PWM dimming signal is 50%, and a period is 100 ms. The first switch Q1 is turned on at first 50 ms of the period, and the LED string forms a complete return circuit. During this time, the LED string obtains power at 10V, and the current flowing through the LED string is Va/R2. At the next 50 ms the period, the first switch Q1 is turned off, and the LED string cannot form a return complete circuit such that the current flowing through the LED string is zero, and LED string does not emit light.

In 1 sec, the above process will repeat 10 times, and the LED string repeats bright and dark for 10 times. The average current of the LED string is Va/R2/2. The brightness of LED backlight sensed by human eye is decreased so as to achieve the adjustment of the brightness of the LED backlight. The reference voltage Va determines the amplitude of the current flowing through the LED string, and the duty ratio of the PWM dimming signal determines the average current of the LED string. Therefore, inputting different reference voltage Va and PWM dimming signal to the LED constant current driver chip 302 can adjust the current flowing through the LED string so as to control the brightness of the LED backlight.

The different display modes require different brightness of the LED backlight. The required reference voltage Va and the duty ratio of the PWM dimming signal are not the same. The present embodiment can prevent the brightness of the LED backlight from changing suddenly at the different display modes.

Specifically, when the MCU receives a display-mode-switch signal for switching from a present display mode to a new display mode, the MCU control the reference voltage Va outputted at the first output terminal 3013 to change gradually from a present voltage to a new voltage required at the new display mode, and control the duty ratio of the PWM dimming signal outputted at the second output terminal 3014 to change gradually from a present duty ratio to a new duty ratio at the new display mode such that the reference voltage Va and the duty ratio of the PWM dimming signal inputted to the LED constant current drive chip 302 change gradually so that the LED constant current driver chip 302 control the current flowing through the LED string to change gradually, that is, the current at present changes gradually to the current corresponding to the new display mode. Therefore, in the process of switching from the present display mode to the new display mode, the brightness of the LED string change gradually to effectively avoid a sudden change of the brightness of the LED string.

The following utilizes the switching of a 2D display mode to a 3D display mode as an example. In the 2D display mode, the first input terminal 3011 of the MCU is for inputting a low voltage, and the second input terminal 3012 is for inputting a duty ratio of the PWM dimming signal required in the 2D display mode. The first output terminal 3013 outputs the reference voltage Va required in the 2D display mode. The MCU do not change the PWM dimming signal inputted at the second input terminal 3012 so that the second output terminal 3014 outputs the PWM dimming signal inputted at the second input terminal 3012. In the 3D display mode, the first input terminal 3011 of the MCU is for inputting a high voltage, and the second input terminal 3012 is for inputting the PWM dimming signal with an arbitrary duty ratio. The first output terminal 3013 outputs the reference voltage required in the 3D display mode. When the PWM dimming signal inputted at the second input terminal 3012 inputs to the MCU, the MCU change its duty ratio so that the second output terminal 3014 outputs the required duty ratio of the PWM dimming signal in the 3D display mode.

It should be noted that, in the 2D display mode, the duty ratio of the PWM dimming signal can be changed according to actual requirement in order to adjust the brightness of the LED backlight. The duty ratio of the PWM dimming signal in the 3D display mode is a fixed and preset duty ratio. In this embodiment, the duty ratio of the PWM dimming signal in the 3D display mode is fixed at 20%.

When the present display mode is a 21D display mode and the new display mode is a 3D display mode, switching from a present display mode to a new display mode, the MCU detects that the voltage at the first input terminal 3011 change from a low voltage to a high voltage, that is, the display-mode-switch signal received by the MCU is at the high voltage. At this time, the MCU changes the duty ratio of the rectangular-wave signal at the first output terminal 30113 and make the duty ratio of the rectangular-wave signal corresponding to the 2D display mode gradually increase to the duty ratio corresponding to the 3D display mode. The changed duty ratio of the rectangular-wave signal becomes the reference voltage Va which is increased linearly through the RC filtering circuit. Therefore, the reference voltage Va increases linearly and gradually to the voltage required in the 3D display mode.

Furthermore, when the 2D display mode switches to the 3D display mode, after the Mai receives the display-mode-switch signal, it controls the duty ratio of the PWM dimming signal at the second output terminal 3014 of the PWM dimming signal in the 2D display mode to change gradually to 20% so as to obtain the required duty ratio in the 3D display mode.

For example, in the 2D display mode, the duty ratio of the PWM dimming signal at the second input terminal 3012 of the MCU is 50%, the duty ratio of the PWM dimming signal outputted at the second output terminal 3014 of the MCU is 50%. In the process of switching from the 2D display mode to the 3D display mode, the MCU controls the duty ratio of the PWM dimming signal at the second output terminal 3014 to change sequentially from 50% to 45%, 40%, 35%, 30%, 25%, and 20%. Therefore, it avoids the duty ratio of the PWM dimming signal to change suddenly from 50% to 20% such that the human eye senses a significant change at the brightness of the LED backlight.

By the foregoing way, in the process of switching from the 2D display mode to the 3D display mode process, through the control function of the MCU, the reference voltage Va of the constant current LED driver chip 302 increases linearly to the required voltage in the 3D display mode, and the duty ratio of the PWM dimming signal gradually changes to 20%. Therefore, the constant, current LED driver chip 302 controls the current flowing through the LED string to change gradually and linearly from the current corresponding to the 2D display mode to the current corresponding to the 3D display mode such that the brightness of the LED backlight changes from the brightness corresponding to the 2D display mode to the brightness corresponding to the 3D display mode so as to avoid a sudden change in the brightness of the LED backlight.

When present display mode is a 3D display mode and the new display mode is a 2D display mode, switching from the present display mode to the new display mode, the MCU detects that the voltage at the first input terminal 3011 change from a high voltage to a low voltage, that is the display-mode-switch signal received by the MCU is at the low voltage. At this time, the MCU changes the duty ratio of the rectangular-wave signal at the first output terminal 3013 and make the duty ratio of the rectangular-wave signal corresponding to the 3D display mode gradually decrease to the duty ratio corresponding to the 2D display mode. The changed duty ratio of the rectangular-wave signal becomes the reference voltage Va which is decreased linearly through the RC filtering circuit. Therefore, the reference voltage Va decreases linearly and gradually to the voltage required in the 2D display mode.

Furthermore, when the 3D display mode switches to the 2D display mode, the second input terminal 3012 of the MCU inputs the required duty ratio of the PWM dimming signal in the 2D display mode. After the MCU receives the display-mode-switch signal, it controls the duty ratio of the PWM dimming signal at the second output terminal 3014 of the PWM dimming signal to change gradually from 20% to obtain the required duty ratio in the 2D display mode.

For example, in the 2D display mode, the duty ratio of the PWM dimming signal is 50%. In the 3D display mode, the duty ratio of the PWM dimming signal at the second input terminal 3012 of the MCU is 50%. However, because now is the 3D display mode, the MCU controls the duty ratio of the PWM dimming signal outputted at the second output terminal 3014 to be 20%. In the process of switching from the 3D display mode to the 2D display mode, the MCU controls the duty ratio of the PWM dimming signal at the second output terminal 3014 to change sequentially from 20% to 25%, 30%, 35%, 40%, 45%, and 50%. Therefore, it avoids the duty ratio of the PWM dimming signal change suddenly from 20% to 50% such that the human eye senses a significant change at the brightness of the LED backlight.

By the foregoing way, in the process of switching from the 3D display mode to the 2D display mode process, through the control function of the MCU, the reference voltage Va of the constant current LED driver chip 302 decreases linearly to the required voltage in the 2D display mode, and the duty ratio of the PWM dimming signal gradually changes from 20% to the duty ratio required in the 2D display mode. Therefore, the constant current LED driver chip 302 controls the current flowing through the LED string to change gradually and linearly from the current corresponding to the 3D display mode to the current corresponding to the 2D display mode such that the brightness of the LED backlight changes from the brightness corresponding to the 3D display mode to the brightness corresponding to the 2D display mode so as to avoid, a sudden change in the brightness of the LED backlight.

Of course, in another embodiment, the reference voltage Va can also change nonlinearly to the required voltage, such as changing by a curve relationship so that the current flowing through the LED string changes in a nonlinear manner to the required current. Therefore, it can prevent the current flowing through the LED string from changing suddenly to the required current.

In another embodiment, the LED backlight driving circuit utilizes the circuit configuration similar to the circuit shown in FIG. 3. The difference is that the MCU only controls the duty ratio of the PWM dimming signal to change gradually in order to achieve the effect of changing the brightness of the LED backlight gradually. Specifically, when the MCU receives the display-mode-switch signal for switching from a present display mode to a new display mode display mode, the MCU changes the rectangular-wave signal at the first output terminal 3013 so that the duty ratio of the rectangular-wave signal changes from the duty ratio corresponding to the present display mode to the duty ratio corresponding to the new display mode. The changed duty ratio of the rectangular-wave signal becomes the reference voltage Va which is required in the new display mode through the RC filtering circuit. Therefore, the reference voltage Va changes from the present voltage to the voltage corresponding to the voltage required in the new display mode, and input to the LED constant current driver chip 302.

In addition, the MCU control the duty ratio of the PWM dimming signal at the second output terminal 3014 to change gradually from the duty ratio corresponding to the present display mode to the duty ratio corresponding to the new display mode. Therefore, in the process of switching from the present display mode to the new display mode, the brightness of the LED string change gradually to effectively avoid a sudden change of the brightness of the LED string.

In another embodiment, the LED backlight driving circuit utilizes the circuit configuration similar to the circuit shown in FIG. 3. The difference is that the MCU only controls the reference voltage Va to change gradually in order to achieve the effect of changing the brightness of the LED backlight gradually. Specifically, when the MCU receives the display-mode-switch signal for switching from a present display mode to a new display mode, the MCU changes the rectangular-wave signal at the first output terminal 3013 so that the duty ratio of the rectangular-wave signal changes gradually from the duty ratio corresponding to the present display mode to the duty ratio corresponding to the new display mode. The gradually changed duty ratio of the rectangular-wave signal becomes the gradually changed reference voltage Va through the RC filtering circuit. Therefore, the reference voltage Va changes gradually from the present voltage to the voltage corresponding to the voltage required in the new display mode, and inputs to the LED constant current driver chip 302.

In addition, the MCU control the duty ratio of the PWM dimming signal at the second output terminal 3014 to change from the duty ratio corresponding to the present display mode to the duty ratio corresponding to the new display mode. By gradually changing the reference voltage Va, the current flowing through the LED string also gradually changes to the current corresponding to the new display mode. Therefore, in the process of switching from the present display mode to the new display mode, the brightness of the LED string change gradually to effectively avoid a sudden change of the brightness of the LED string.

Figure 4:
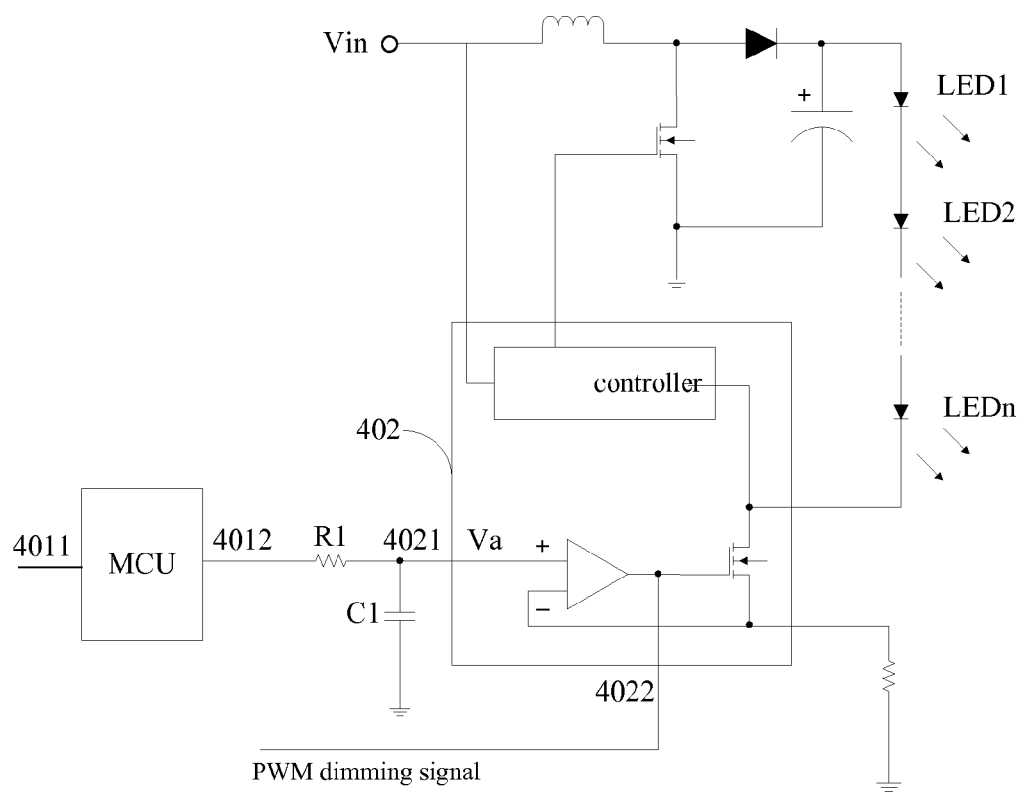
FIG. 4 is a specific drawing of light source driving circuit of light emitting semiconductor according to another embodiment of the present invention.

As shown in FIG. 4, in another embodiment of the LED backlight driving circuit, the MCU may include only a first input terminal 4011 and a first output terminal 4012. The LED constant current driver chip 402 includes a second input terminal 4021 and a third input terminal 4022. The first input terminal 4011 of the MCU is for inputting a display-mode-switch signal. The first output terminal 4012 connects to the second input terminal 4021 of the constant current LED driver chip 402 so as to output the reference voltage Va required by the LED constant current driver chip. The third input terminal 4022 of the LED constant current driver chip 402 is for inputting the PWM dimming signal. In different display modes, the PWM dimming signals at the third input terminal 4022 of the LED constant current driver chip 402 are different.

When the MCU receives a display-mode-switch signal for switching from a present display mode to a new display mode, the MCU controls the reference voltage Va outputted at the first output terminal 4012 to change gradually from a present voltage to a new voltage required by the new display mode, and controls the LED constant current driver chip 402, and make the LED constant current driver chip 402 control the current flowing through the LED string to change gradually. Therefore, in the process of switching from the present display mode to the new display mode, the brightness of the LED string change gradually to avoid a sudden change of the brightness of the LED string.

In the above embodiments, the driving control circuit and the constant current driving circuit are respectively realized by the MCU and the LED constant current driver chip. In another embodiment, the driving control circuit and LED constant current driving circuit may be discrete component circuits. The present invention is not limited.

Furthermore, the light emitting semiconductors in the above embodiments are all LEDs, and the light source driving circuits for the light emitting semiconductors are the LED backlight driving circuits. However, in another embodiment, the light emitting semiconductor may be OLED, and the light source driving circuit for the light emitting semiconductors is an OLED light source driving circuit for driving the OLED display panel to operate. When the driving control circuit receives a signal for switching the display mode from the present display mode to the new display mode of the OLED display panel, it controls the constant current driving circuit such that in the process of switching from the present display mode to the new display mode, the driving control circuit controls the current flowing through the OLED to change gradually so that the brightness of the OLED display panel changes gradually to avoid a sudden change of the brightness of the OLED display panel in different display modes.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A light source driving circuit of light emitting semiconductor comprising:
a driving control circuit having a first input terminal, a second input terminal, a first output terminal, and a second output terminal, wherein the first input terminal is for inputting a display-mode-switch signal, and the second input terminal is for inputting a dimming signal; and
a constant current driving circuit coupled to the driving control circuit for controlling a current flowing through the light emitting semiconductor and having a third input terminal and a fourth input terminal, wherein, the constant current driving circuit further includes a comparator, a first switch and a controller, and an output terminal of the comparator connects to a control terminal of the first switch; and
a voltage conversion circuit connected with the controller of the constant current driving circuit for converting an external power source to a voltage required for driving the light emitting semiconductor;
wherein, the first output terminal of the driving control circuit connects to the third input terminal of the constant current driving circuit for inputting a reference voltage to an input terminal of the comparator of the constant current driving circuit; the second output terminal of the driving control circuit connects to the fourth input terminal of the constant current driving circuit for inputting the dimming signal which has passed through the driving control circuit to the control terminal of the first switch of the constant current driving circuit; when the driving control circuit receives the display-mode-switch signal which has an indication for switching from a present display mode to a new display mode, the driving control circuit controls the reference voltage and/or the dimming signal to change gradually and linearly in order to control the constant current driving circuit such that in the process of switching from the present display mode to the new display mode, the current flowing through the light emitting semiconductor changes gradually and linearly, wherein the light emitting semiconductor is an LED; and
wherein, the light source driving circuit further comprises an RC filtering circuit and having:
a first resistor connected in series between the first output terminal of the driving control circuit and the third input terminal of the constant current driving circuit; and
a first capacitor having two ends, wherein one end connects to the third input terminal of the constant current driving circuit and the other end connects to a ground;
wherein, an output voltage signal of the first output terminal of the driving control circuit is a rectangular-wave signal, after the rectangular-wave signal is filtered by the RC filtering circuit, the rectangular-wave signal become a DC voltage and inputs to the input terminal of the comparator of the constant current driver chip and the DC voltage is the reference voltage required for the constant current driver circuit.

2. The circuit according to claim 1, wherein, when the driving control circuit receives the display-mode-switch signal which has the indication for switching from the present display mode to the new display mode, the driving control circuit controls the reference voltage outputted from the first output terminal to change gradually from a present voltage to a new voltage required at the new display mode, and controls a duty ratio of the dimming signal outputted from the second output terminal to change gradually from a present duty ratio to a new duty ratio required at the new display mode, and further controls the constant current driving circuit such that the constant current driving circuit controls the current flowing through the light emitting semiconductor to change gradually from a present current to a current corresponding to the new display mode.

3. The circuit according to claim 2, wherein,
when the present display mode is a 2D display mode and the new display mode is a 3D display mode, and the driving control circuit receives a display-mode-switch signal which has an indication for switching from the 2D display mode to the 3D display mode, the driving control circuit controls the reference voltage outputted from the first output terminal to increase gradually to a voltage required in the 3D display mode, and the driving control circuit controls a duty ratio of the dimming signal outputted at the second output terminal and corresponding to the 2D display mode to gradually increase to a predetermined duty ratio corresponding to the 3D display mode; and
when the present display mode is a 3D display mode and the new display mode is a 2D display mode, and the driving control circuit receives a display-mode-switch signal which has an indication for switching from the 3D display mode to the 2D display mode, the driving control circuit controls the reference voltage outputted from the first output terminal to decrease gradually to a voltage required in the 2D display mode, and the driving control circuit controls a duty ratio of the dimming signal outputted at the second output terminal and corresponding to the 3D display mode to gradually decrease to a duty ratio corresponding to the 2D display mode.

4. The circuit according to claim 1, wherein, when the driving control circuit receives the display-mode-switch signal which has the indication for switching from the present display mode to the new display mode, the driving control circuit controls the reference voltage outputted from the first output terminal to change from a present voltage to a new voltage required by the new display mode, and controls the duty ratio of the dimming signal outputted from the second output terminal to change gradually from a present duty ratio to a new duty ratio required in the new display mode, and further controls the constant current driving circuit such that the constant current driving circuit controls the current flowing through the light emitting semiconductor to change gradually from a present current to a current corresponding to the new display mode.

5. The circuit according to claim 1, wherein, when the driving control circuit receives the display-mode-switch signal which has the indication for switching from the present display mode to the new display mode, the driving control circuit controls the reference voltage outputted from the first output terminal to change gradually from a present voltage to a new voltage required by the new display mode, and controls the duty ratio of the dimming signal outputted—from the second output terminal to change from a present duty ratio to a new duty ratio required in the new display mode, and further controls the constant current driving circuit such that the constant current driving circuit controls the current flowing through the light emitting semiconductor to change gradually from a present current to a current corresponding to the new display mode.

6. A light source driving circuit of light emitting semiconductor comprising:
a driving control circuit having a first input terminal, a second input terminal, a first output terminal, and a second output terminal, wherein the first input terminal is for inputting the display-mode-switch signal, and the second input terminal is for inputting a dimming signal; and
a constant current driving circuit coupled to the driving control circuit for controlling a current flowing through the light emitting semiconductor and having a third input terminal and a fourth input, wherein, the constant current driving circuit further includes a comparator and a first switch and a controller, and an output terminal of the comparator connects to a control terminal of the first switch; and
a voltage conversion circuit connected with the controller of the constant current driving circuit for converting an external power source to a voltage required for driving the light emitting semiconductor;
wherein, the first output terminal of the driving control circuit connects to the third input terminal of the constant current driving circuit for inputting a reference voltage to an input terminal of the comparator of the constant current driving circuit; the second output terminal of the driving control circuit connects to the fourth input terminal of the constant current driving circuit for inputting the dimming signal which has passed through the driving control circuit to the control terminal of the first switch of the constant current driving circuit; the driving control circuit controls the reference voltage and/or the dimming signal to change gradually in order to control the constant current driving circuit; and
wherein, when the driving control circuit receives a display-mode-switch signal which has an indication for switching from a present display mode to a new display mode, the driving control circuit controls the constant current driving circuit such that in the process of switching from the present display mode to the new display mode, the current flowing through the light emitting semiconductor changes gradually; and
wherein, the light source driving circuit further comprises an RC filtering circuit and having:
a first resistor connected in series between the first output terminal of the driving control circuit and the third input terminal of the constant current driving circuit; and
a first capacitor having two ends, wherein one end connects to the third input terminal of the constant current driving circuit and the other end connects to a ground;
wherein, an output voltage signal of the first output terminal of the driving control circuit is a rectangular-wave signal, after the rectangular-wave signal is filtered by the RC filtering circuit, the rectangular-wave signal become a DC voltage and inputs to the input terminal of the comparator of the constant current driver chip and the DC voltage is the reference voltage required for the constant current driver circuit.

7. The circuit according to claim 6, wherein,
when the driving control circuit receives the display-mode-switch signal which has the indication for switching from the present display mode to the new display mode, the driving control circuit controls the reference voltage outputted from the first output terminal to change gradually from a present voltage to a new voltage required at the new display mode, and controls a duty ratio of the dimming signal outputted from the second output terminal to change gradually from a present duty ratio to a new duty ratio required at the new display mode, and further controls the constant current driving circuit such that the constant current driving circuit controls the current flowing through the light emitting semiconductor to change gradually from a present current to a current corresponding to the new display mode.

8. The circuit according to claim 7, wherein,
when the present display mode is a 2D display mode and the new display mode is a 3D display mode, and the driving control circuit receives a display-mode-switch signal which has an indication for switching from the 2D display mode to the 3D display mode, the driving control circuit controls the reference voltage outputted from the first output terminal to increase gradually to a voltage required in the 3D display mode, and the driving control circuit controls a duty ratio of the dimming signal outputted at the second output terminal and corresponding to the 2D display mode to gradually increase to a predetermined duty ratio corresponding to the 3D display mode; and when the present display mode is a 3D display mode and the new display mode is a 2D display mode, and the driving control circuit receives a display-mode-switch signal which has an indication for switching from the 3D display mode to the 2D display mode, the driving control circuit controls the reference voltage outputted from the first output terminal to decrease gradually to a voltage required in the 2D display mode, and the driving control circuit controls a duty ratio of the dimming signal outputted from the second output terminal and corresponding to the 3D display mode to gradually decrease to a duty ratio corresponding to the 2D display mode.

9. The circuit according to claim 6, wherein, when the driving control circuit receives the display-mode-switch signal which has the indication for switching from the present display mode to the new display mode, the driving control circuit controls the reference voltage outputted from the first output terminal to change from a present voltage to a new voltage required by the new display mode, and controls the duty ratio of the dimming signal outputted from the second output terminal to change gradually from a present duty ratio to a new duty ratio required in the new display mode, and further controls the constant current driving circuit such that the constant current driving circuit controls the current flowing through the light emitting semiconductor to change gradually from a present current to a current corresponding to the new display mode.

10. The circuit according to claim 6, wherein, when the driving control circuit receives the display-mode-switch signal which has the indication for switching from the present display mode to the new display mode, the driving control circuit controls the reference voltage outputted from the first output terminal to change gradually from a present voltage to a new voltage required by the new display mode, and controls the duty ratio of the dimming signal outputted from the second output terminal to change from a present duty ratio to a new duty ratio required in the new display mode, and further controls the constant current driving circuit such that the constant current driving circuit controls the current flowing through the light emitting semiconductor to change gradually from a present current to a current corresponding to the new display mode.

11. The circuit according to claim 6, wherein, when the driving control circuit receives the display-mode-switch signal which has the indication for switching from the present display mode to the new display mode, the driving control circuit controls the constant current driving circuit such that in the process of switching from the present display mode to the new display mode, the current flowing through the light emitting semiconductor changes gradually and linearly.

12. The circuit according to claim 6, wherein, the light emitting semiconductor is an LED.

* * * * *